United States Patent [19]

Sakurai et al.

[11] Patent Number: 5,724,930

[45] Date of Patent: Mar. 10, 1998

[54] TIMING CASE COVER FOR ENGINE

[75] Inventors: Kenichi Sakurai; Tatsuo Niiyama; Masahiro Uchida, all of Iwata, Japan

[73] Assignee: Yamaha Hatsudoki Kabushiki Kaisha, Iwata, Japan

[21] Appl. No.: 734,652

[22] Filed: Oct. 21, 1996

[51] Int. Cl.[6] ............................................. F01L 1/02
[52] U.S. Cl. ........................ 123/90.31; 123/90.38; 123/195 C; 123/198 E
[58] Field of Search ...................... 123/90.27, 90.31, 123/90.38, 195 C, 198 E

[56] References Cited

U.S. PATENT DOCUMENTS

| | | | |
|---|---|---|---|
| 4,993,374 | 2/1991 | Okui | 123/90.31 |
| 5,010,855 | 4/1991 | Ogami et al. | 123/198 E |
| 5,099,945 | 3/1992 | Okui et al. | 123/90.31 |
| 5,154,144 | 10/1992 | Okui et al. | 123/90.31 |
| 5,184,582 | 2/1993 | Okui et al. | 123/90.31 |
| 5,452,690 | 9/1995 | Kobayashi | 123/90.38 |

*Primary Examiner*—Weilun Lo
*Attorney, Agent, or Firm*—Knobbe, Martens, Olson & Bear LLP

[57] ABSTRACT

A compact arrangement for an inline multiple-cylinder engine for driving a pair of twin overhead camshafts. The camshafts are driven by a drive that includes an intermediate shaft and at least a portion of the drive and the intermediate shaft is accessible through one or more openings formed in the side of the engine body. A manifold is also provided on this side of the engine and is configured so that it does not substantially obstruct the openings.

29 Claims, 9 Drawing Sheets

TIMING CASE COVER FOR ENGINE

BACKGROUND OF THE INVENTION

This invention relates to an internal combustion engine having at least one overhead camshaft and more particularly to an improved timing case cover for such an engine.

The use of overhead mounted camshafts for valve actuation in internal combustion engines is a well-known way in obtaining improved engine performance. Generally, the camshaft or camshafts, if plural camshafts are employed, are driven from the crankshaft through a timing mechanism. In addition to transferring drive from the crankshaft to the camshafts, the drive reduces the speed of the camshafts so that they rotate at one-half crankshaft speed to accommodate the four-cycle operation of the engine. Conventionally, the camshaft drive has been located at one end of the engine. Although this arrangement has the expedient of facilitating access of the timing drive for servicing, it extends the overall length of the engine.

There have been proposed, therefore, arrangements wherein the camshafts are driven from a drive that is taken off of the crankshaft at a point between its ends. Such drive mechanisms have the advantage of reducing the overall length of the engine. However, this type of arrangement does offer a problem in that the camshaft drive mechanism becomes less accessible.

It is, therefore, a principal object of this invention to provide an improved camshaft drive arrangement for an engine wherein the camshaft drive is not located at the end of the engine and wherein the drive is nevertheless accessible for servicing.

One type of arrangement for accommodating such an intermediate camshaft drive includes one or more intermediate shafts. This type of drive drives at least one intermediate shaft from the crankshaft. Drive is transmitted from this one intermediate shaft to the camshafts by a second drive. Frequently, this second drive may also include a further intermediate shaft. In one type of arrangement of this nature, a first intermediate shaft is journaled in the cylinder block, and a second intermediate or camshaft driving shaft is journaled in the cylinder head. These intermediate shafts are normally located at one side of the engine. Although this type of driving mechanism has advantages, it also suffers from the possible disability of access for servicing purposes.

It is, therefore, a still further object of this invention to provide an improved camshaft drive arrangement for an engine having at least one intermediate shaft and wherein the intermediate shaft and its drive are accessible for servicing.

In addition to the problem of providing for servicing of the intermediate shaft or shafts, the journaling of these shafts can also present some problems. In one type of arrangement, the intermediate shaft is located so that it is journaled in a lower face of the cylinder block and by journals that are formed in a lower face of the cylinder block and which are coplanar with the journals of the crankshaft. Although this type of mechanism has advantages in facilitating machining and assembly, it also tends to cause the engine to be too wide at its lower end. This can be a disadvantage, particularly when utilizing transverse engine placements and wherein the wheel drive is closely adjacent the lower end of the engine.

It is, therefore, a still further object of this invention to provide an improved engine arrangement having a camshaft drive including an intermediate shaft and wherein the intermediate shaft is journaled in a simple manner and one which facilitates servicing and access.

A still further problem attendant with the use of intermediate shaft drive mechanisms for driving the camshafts is that frequently the manifolding for the engine is disposed on one or both sides of the engine. Hence, there may be presented further access problems for accessing the camshaft drive mechanism when it is obscured by a manifold of the engine.

It is, therefore, a still further object of this invention to provide an improved intermediate shaft drive arrangement for an engine and manifolding arrangement wherein the camshaft drive mechanism is not obscured from servicing to any significant extent by the manifold.

In conjunction with engine constructions, the crankshaft is frequently journaled on webs formed by the cylinder block and bearing caps that are affixed to these webs. One problem with this type of construction is that the webs in effect divide the crankcase into a number of chambers, each associated with a respective cylinder. By closing or restricting the communication between adjacent cylinders, pumping losses can be generated. That is, each crankcase chamber formed by the dividing webs acts as a further chamber that has its volume vary when the piston moves upwardly and downwardly in its cylinder bore. If communication is not provided between the crankcase chambers, pumping losses will occur.

It has been the practice to provide openings or holes in the webs for the purpose of reducing pumping losses. However, these openings will weaken the webs and reduce the overall rigidity of the engine.

It is, therefore, a still further object of this invention to provide an improved engine architecture wherein pumping losses can be avoided and wherein the structural integrity of the cylinder block is not compromised.

SUMMARY OF THE INVENTION

This invention is adapted to be embodied in an engine assembly that is comprised of a main body assembly. The main body assembly is comprised of at least a cylinder head member, a cylinder block member and a crankcase member, which are all affixed together. The cylinder block member forms a plurality of cylinder bores that contain pistons reciprocating therein. The cylinder block member and the crankcase member define a crankcase chamber in which a crankshaft is rotatably journaled. Means are provided for driving the crankshaft from the reciprocation of the pistons. The cylinder head member, cylinder block member, and pistons form combustion chambers. A plurality of flow passages are formed in the cylinder head member and serve the combustion chambers. Valves are supported in the cylinder head member tbr controlling the flow through the flow passages. At least one camshaft is journaled for rotation in the cylinder head member for actuating at least some of the valves. An intermediate shaft is journaled for rotation in one of the engine body members at one side thereof. A first drive drives the intermediate shaft from the crankshaft. A second drive drives the camshaft from the intermediate shaft. The one body member is formed with an opening in the one side thereof which is aligned with at least a portion of the intermediate shaft. A removable cover closes this opening.

DETAILED DESCRIPTION OF THE PREFERRED EMBODIMENTS OF THE INVENTION

Figure 1:
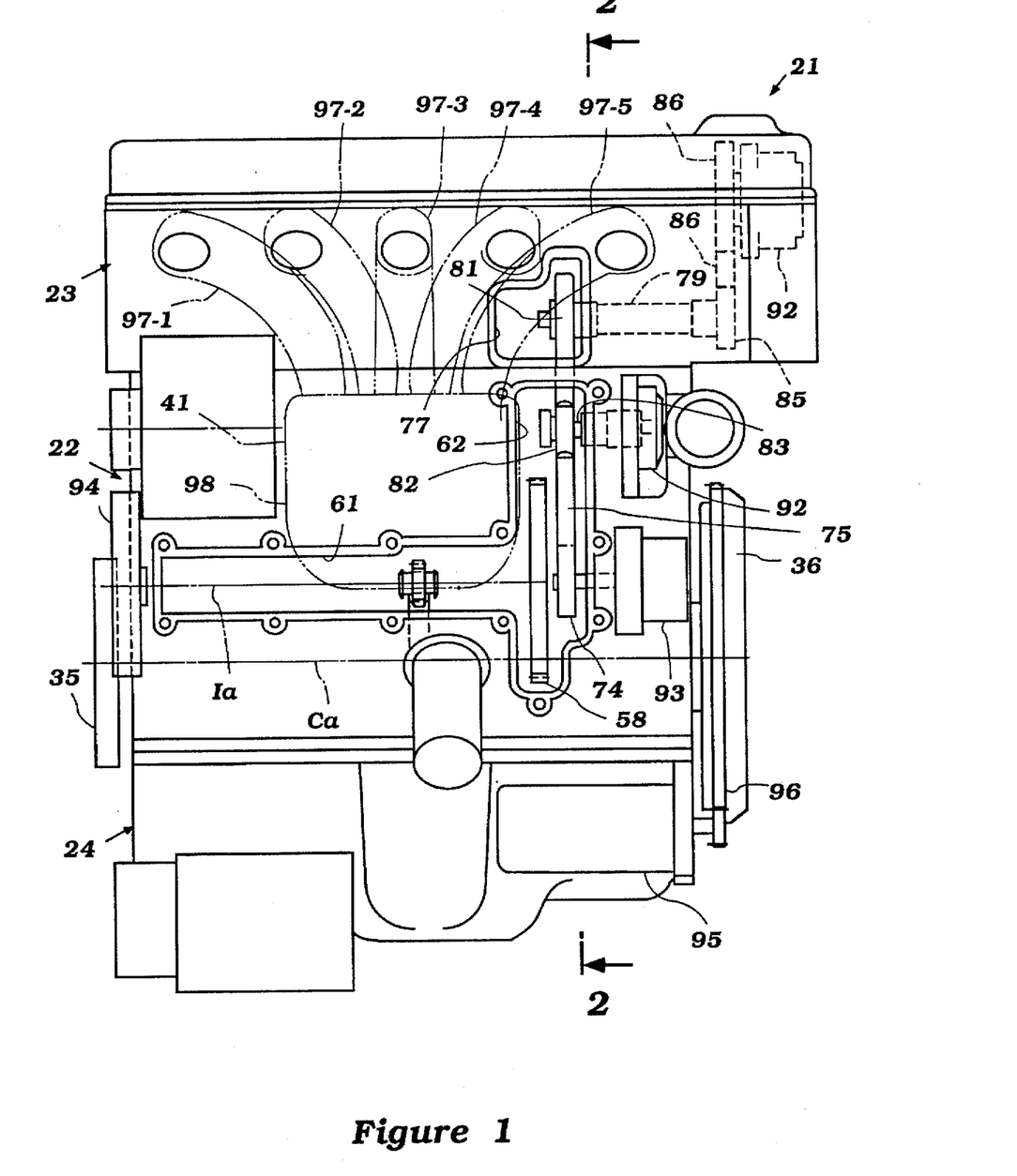
FIG. 1 is a side elevational view of an internal combustion engine constructed in accordance with an embodiment of the invention, with a portion of the intake manifold being shown in phantom and with the timing covers removed.
Figure 2:
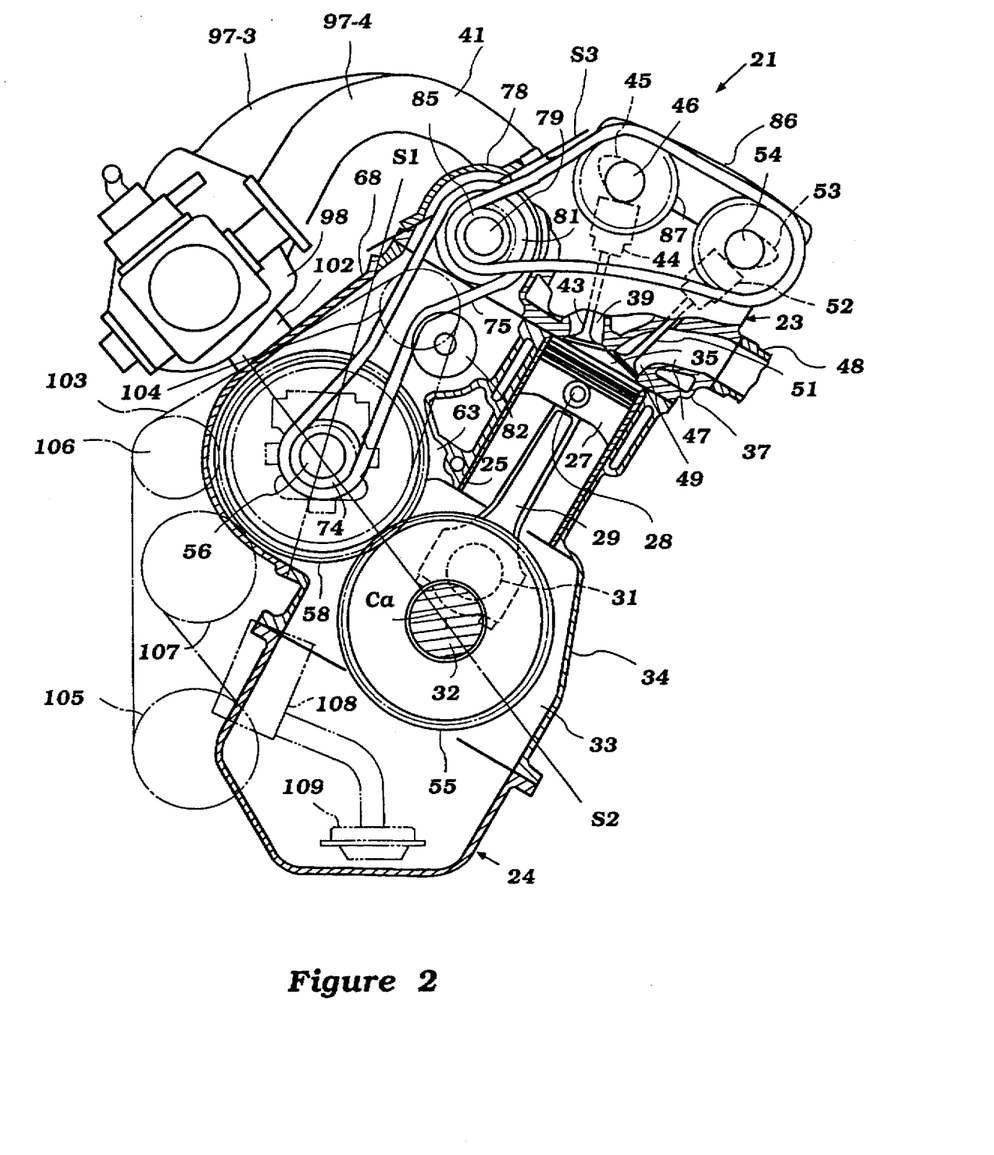
FIG. 2 is a cross-sectional view taken along the line 2—2 of FIG. 1, with the timing covers in place and the manifold shown in solid lines.

Referring now in detail to the drawings and initially primarily to FIGS. 1 and 2, an internal combustion engine constructed in accordance with an embodiment of the invention is identified generally by the reference numeral 21. The engine 21, as illustrated, is particularly adapted for use in transverse placement in an engine compartment of a vehicle powered by the engine 21. In the illustrated embodiment, the engine 21 is depicted as being of the inline type and operates on a four-cycle, spark-ignited principle. It will be apparent, however, to those skilled in the art that certain features of the invention may be employed with engines operating on different cycles and having other cylinder configurations. However, the invention has particular utility in conjunction with multi-cylinder engines because it provides a compact and highly serviceable camshaft driving arrangement for such engines and has other advantages, as will become apparent.

The engine 21 is comprised of a main body assembly that consists primarily of three major components. These major components comprise a cylinder block member 22, an attached cylinder head member 23, and a further attached crankcase member 24. These members 22, 23, and 24 are affixed to each other in a known manner. That is, the cylinder head member 23 is affixed to the upper end of the cylinder block member 22. The crankcase member 24 is affixed to the lower end of the cylinder block member 22.

The cylinder block member 22 is provided with a plurality of inline cylinder bores 25 which may be formed from liners 26 that are pressed, cast, or plated onto the cylinder block member 22 in a suitable manner. As will be apparent from FIG. 2, the axes of the cylinder bores 25 are inclined from the vertical toward the right-hand side, as seen in FIG. 2. In a front engine transverse relationship, this inclination may be in a rearward direction toward the passengers' compartment and away from the front of the vehicle. The utilization of the engine 21 is, however, not so limited.

In the illustrated embodiment, the cylinder block member 22 is formed with five cylinder bores 25. A piston 27 is reciprocally supported in each of the cylinder bores 25. Each piston 27 is connected by a piston pin 28 to the upper or small end of a respective connecting rod 29. The connecting rods 29 are journaled on the throws 31 of a crankshaft, indicated generally by the reference numeral 32. The crankshaft 32 is rotatably journaled in a suitable manner in a crankcase chamber 33 that is formed by a skirt 34 of the cylinder block 22 and by the crankcase member 24. This journaling of the crankshaft 32 may be provided by webs formed in the cylinder block 22, and specifically its skirt portion 34. These webs may extend down a substantial distance without risk of creating pumping losses, for a reason which will be described later.

Figure 3:
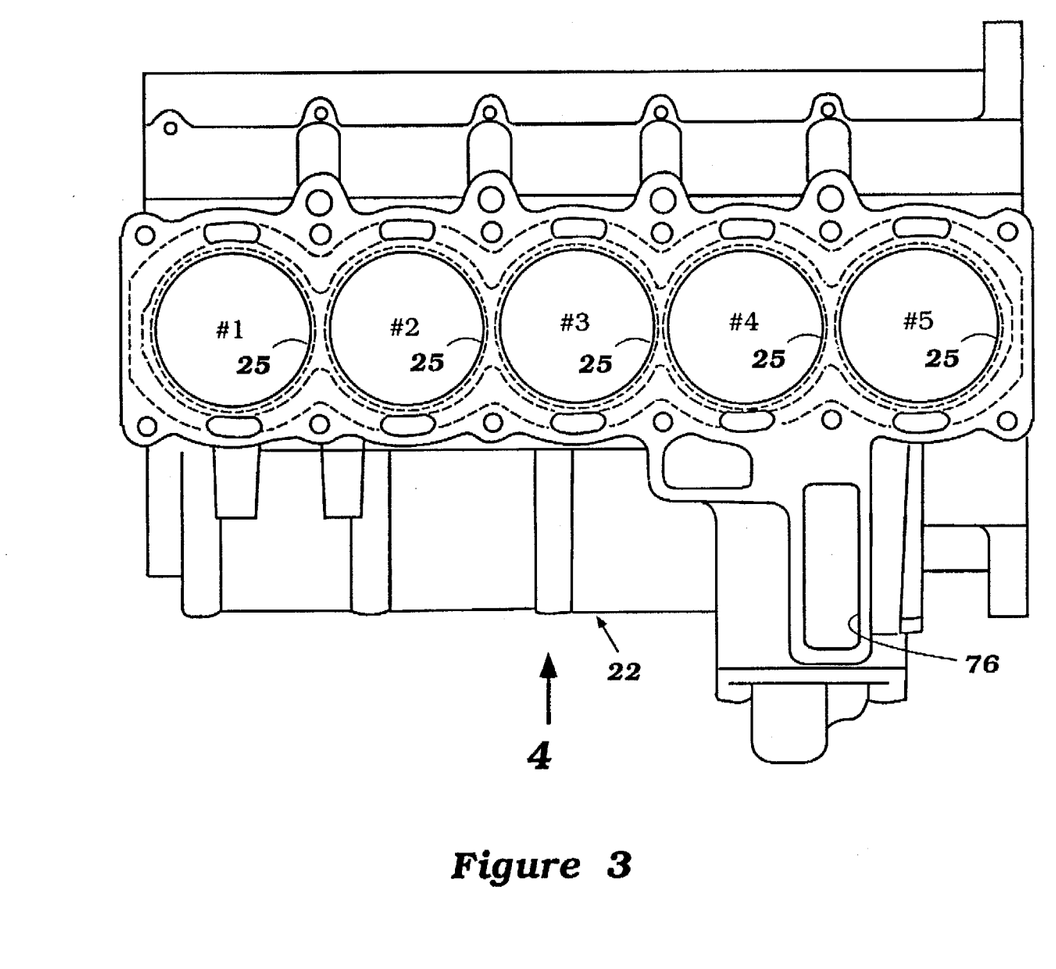
FIG. 3 is a top plan view of the cylinder block, with the cylinder head, pistons, and various timing mechanisms removed so as to more clearly show the construction.

As seen in FIG. 1, the front end of the engine 21, this being the left-hand side as viewed in FIG. 1, has afffixed to it a pulley 35 which may include a torsional vibration damper. A flywheel 36 is affixed to the other end of the crankshaft 32, also in a well-known manner. The rotational axis of the crankshaft 32 is indicated by the line $c_a$. It should be noted that the left-hand side of the engine 21 is referred to as the front and the right-hand side is referred to as the rear when viewing FIG. 1 and FIG. 3. The cylinder bores 25 are numbered from left to right in accordance with this convention. This is true even though the engine is mounted transversely in the engine compartment.

Referring now to the cylinder head member 23, this includes a main casting 37 that is formed with individual recesses 38 which cooperate with the pistons 27 and cylinder bores 25 to form the combustion chambers of the engine. Because of the fact that the cylinder head recesses 38 form a substantial portion of the volume of these combustion chambers at top dead center, the reference numeral 38 will be utilized at times to identify the combustion chamber.

An induction charge is delivered to these combustion chambers through intake passages 39 which are formed in the cylinder head assembly 23 at the front side of it, as viewed and installed in the vehicle. An induction system, comprised primarily of an intake manifold and throttle body assembly, indicated generally by the reference numeral 41, supplies an intake charge to the combustion chamber through these intake passages 39. This induction system 41 will be described later in more detail by particular reference to FIGS. 8–11.

The number of intake passages 39 which serve each combustion chamber 38 may be either one, two, or more, depending upon the basic engine design. The number of intake passages serving each combustion chamber (and these intake passages may be Siamesed if multiples are used) is not significant in the particular invention described in this application. However, each intake passage 39 terminates at an intake valve seat 42 which is valved by a respective poppet-type intake valve 43. The poppet-type intake valves 43 are slidably supported in the cylinder head assembly 23 and are actuated in a suitable manner, for example, by thimble tappets 44 that are actuated by the lobes 45 of an intake camshaft 46. The intake camshaft 46 is mounted in the cylinder head member 23 in any suitable manner and is driven at one-half crankshaft speed in a manner which will be described.

Exhaust passages 47 are formed in the cylinder head member 23 on the side opposite the intake passages 39. These exhaust passages 47, which also may be of any suitable number per cylinder, discharge exhaust gases into an exhaust manifold which is shown partially and indicated by the reference numeral 48. This exhaust manifold 48 collects the exhaust gases and discharges them to the atmosphere through any suitable exhaust system.

Like the intake passages 39, the exhaust passages 47 have at their combustion chamber recess end a valve seat 49 that is valved by a poppet-type exhaust valve 51. The poppet-type exhaust valves 51 are supported for reciprocation in the cylinder head member 23 in a suitable fashion. These exhaust valves 51 are actuated via thimble tappets 52 by the lobes 53 of an exhaust camshaft 54. The exhaust camshaft 54, like the intake camshaft 46, is mounted for rotation in the cylinder head member 23. The axes of rotation of the intake and exhaust camshafts 46 and 57 are parallel to each other and parallel to the crankshaft axis of rotation $c_a$.

The manner of driving the intake and exhaust camshafts 46 and 54 will now be described by primary reference to FIGS. 1, 2, 6, and 7. As may be best seen in FIG. 6, not all of the throws 31 of the crankshaft 32 are balanced. The area of one of the unbalanced throws, this being that of the number 4 cylinder in the described embodiment, is formed with an integral drive gear 55 formed thereon. This drive gear is utilized to drive a combined intermediate and balance shaft, indicated generally by the reference numeral 56.

The balance shaft 56 is journaled, in a manner which will be described, in one side of the cylinder block member 22, and specifically its forward side, when installed in the vehicle. This balance or intermediate shaft 56 extends for a length which is slightly less than the length of the crankshaft 32 and carries a balance mass 57 thereon. The balance mass 57 is driven at the same speed as the rotational speed of the crankshaft 32, but in an opposite direction due to the fact that a gear section 58 is connected by a torsional damping coupling 58 to the balance or intermediate shaft 56 and is enmeshed with the crankshaft gear 55. As a result, if the crankshaft 32 rotates in a counterclockwise direction, as indicated by the arrow a in FIG. 7, the balance or intermediate shaft 56 will be driven in a clockwise direction, as indicated by the arrow b in this figure.

Figure 4:
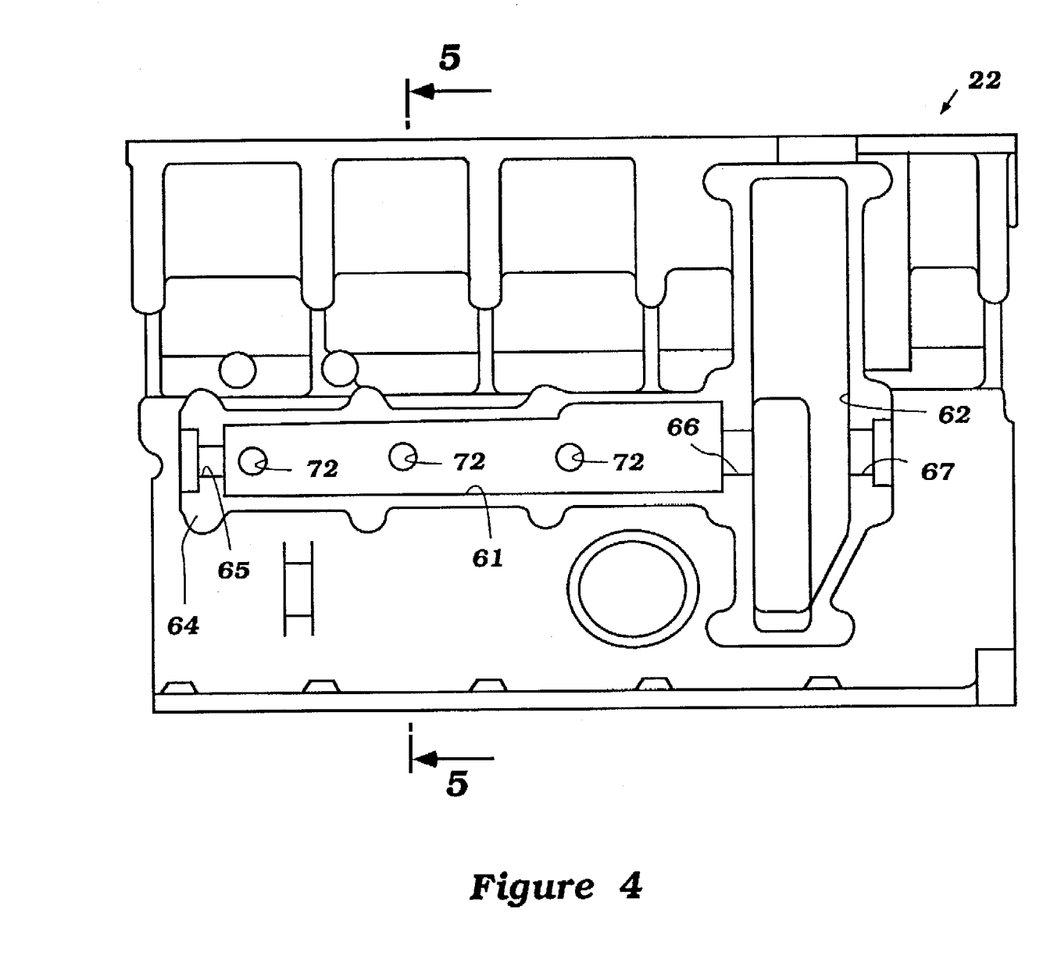
FIG. 4 is a side elevational view of the cylinder block looking in the direction of the arrow 4 in FIG. 3 and again with the internal components of the cylinder block removed.
Figure 5:
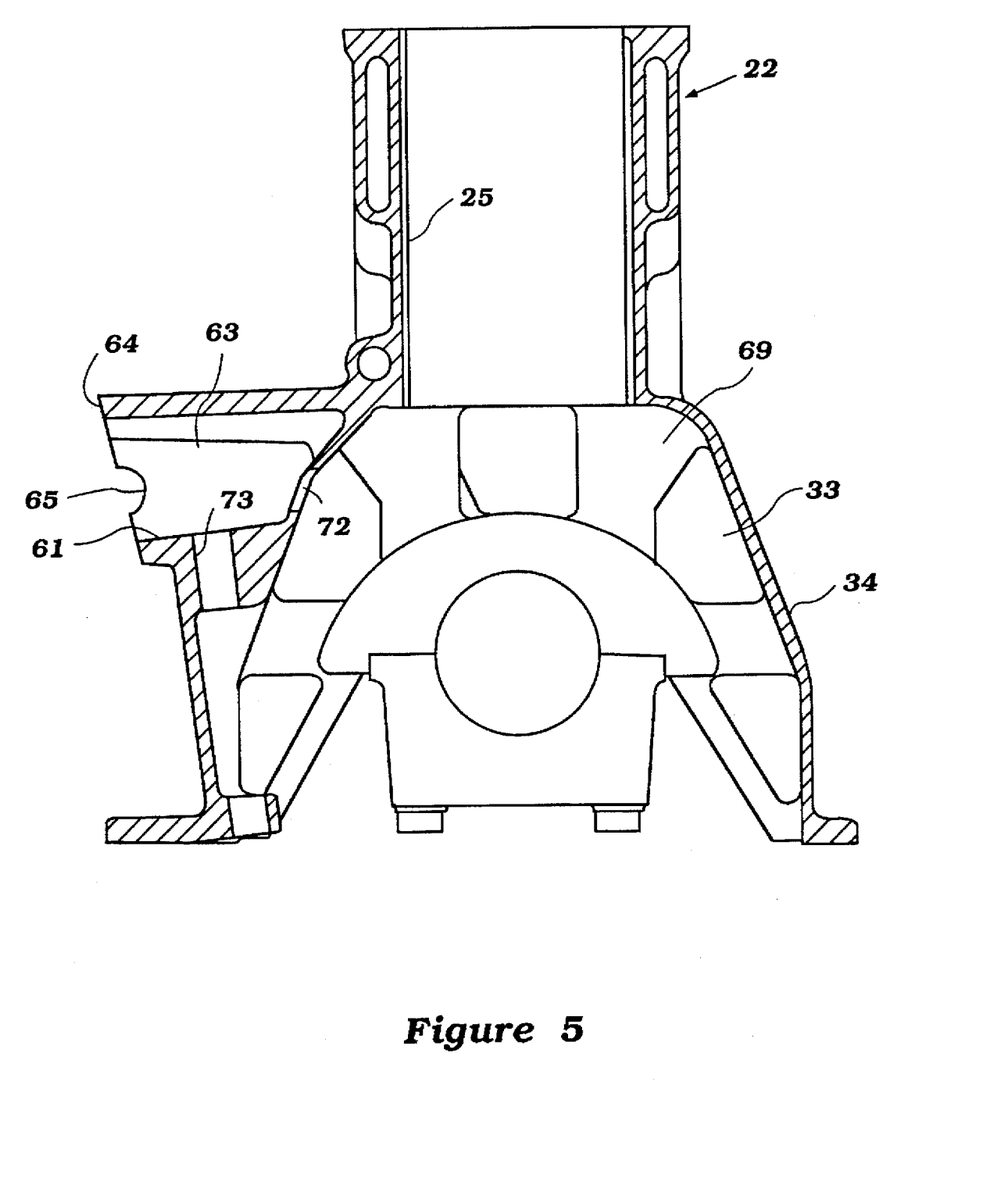
FIG. 5 is a cross-sectional view taken along the line 5—5 of FIG. 4.
Figure 6:
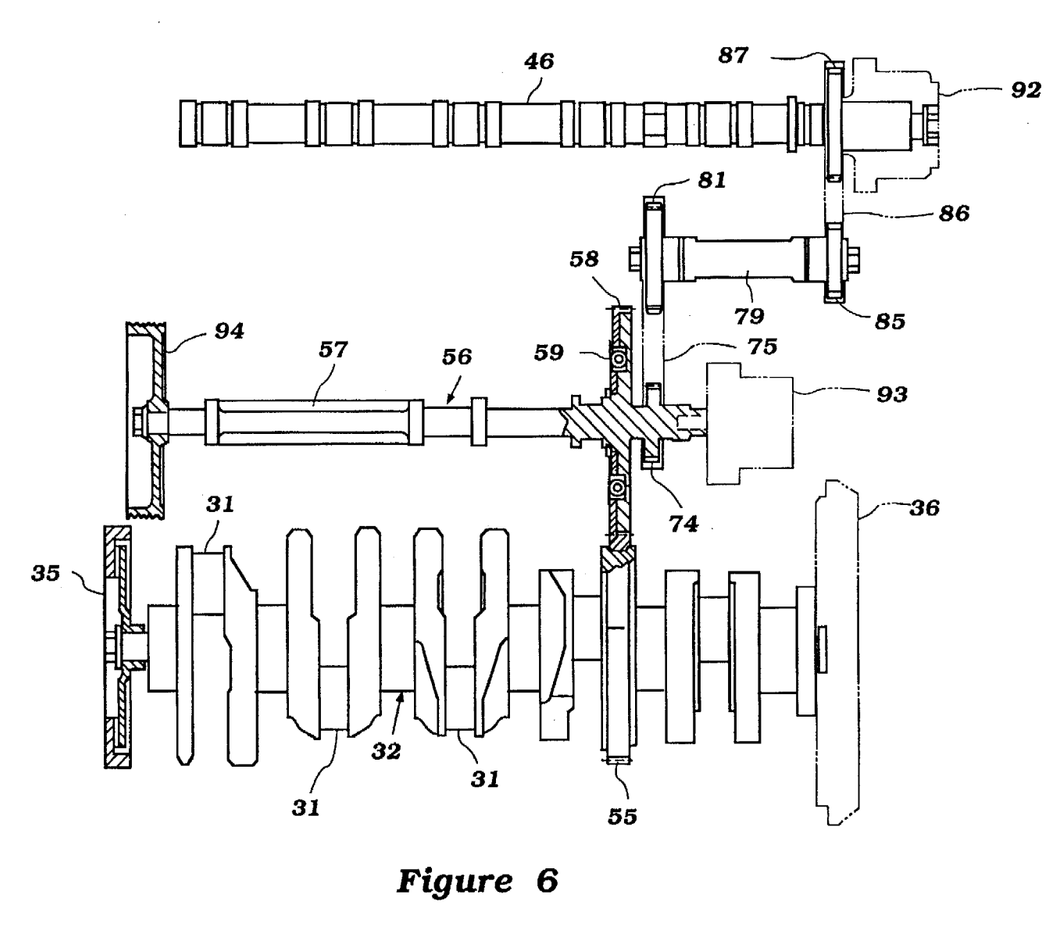
FIG. 6 is a developed view showing the camshaft drive arrangement, with certain of the components and accessories being shown in phantom.

As may be best seen in FIGS. 2, 4, and 5, the front side of the cylinder block member 23 is formed with a generally L-shaped window opening comprised of a longitudinally extending long leg 61 and a vertically extending short leg 62. These legs are formed as basic openings through the side of the cylinder block. The long leg 61 forms a cavity 63 in which the balance and intermediate shaft 56 is journaled. These openings are defined by a surface 64 of the outer side of the cylinder block member 22.

The surface 64 is machined with a plurality of integral bearing surfaces 65, 66, and 67, as best seen in FIG. 4. The intermediate shaft 56 is formed with bearing surfaces that are journaled by these cylinder block surfaces 65, 66, and 67, and corresponding bearing surfaces formed by a cover plate 68 that is detachably connected to the cylinder block 22 and which closes the cavity 63. These corresponding bearing surfaces of the cover plate 68 are shown partially in FIG. 5 wherein the cover plate 68 is shown in phantom and one of the bearing surfaces is indicated by the reference numeral 65a. This cover member also has a generally L-shaped configuration. It should be noted that the intermediate shaft 56 extends outwardly beyond the surfaces 64 at both the front and rear ends of the engine, for a reason which will be described.

The balance or intermediate shaft 56 rotates about an axis that lies on a plane S1 (FIG. 2) which is defined by the cylinder block surface 64. This plane S1 is disposed at an obtuse angle to a plane S2 that intersects the intermediate shaft axis $I_a$ and the crankshaft axis $c_a$. As will be seen from FIG. 2, this orientation permits the positioning of the intermediate shaft 56 at a relatively high location so as to not interfere with a final drive or other components which may be formed externally of the engine. Also, this positioning places the intermediate shaft 56 in an upward and more easily accessed position for servicing, if required.

As may be seen in FIG. 5, the individual webs 69 of the cylinder block skirt 34 that are utilized to journal the crankshaft 32 appear. In order to reduce pumping losses, openings 72 are formed in the wall that separates the crankcase chamber 33 from the balance or intermediate shaft chamber 63. These openings 72 form air paths between the respective webs 69 and reduce pumping losses in the engine.

The chamber 63 is also formed with a drain passage 73 so that lubricant for lubricating the mechanism can drain back to the crankcase chamber 24.

Referring now primarily again to FIGS. 1, 2, 6, and 7, the intermediate shaft 56 is formed with a sprocket portion 74 immediately adjacent the drive gear 58. This sprocket 74 drives a first flexible transmitter, such as a chain 75. This chain 75 extends generally upwardly through the short leg 61 of the opening for the intermediate shaft so as to afford access for replacement or servicing purposes. The chain 75 continues to extend upwardly beyond the recess opening 62 and through an opening 76 (FIG. 3) formed in the upper deck of the cylinder block 22. The cylinder block opening 76 communicates with a corresponding opening 77 formed in the cylinder head lower surface and which extends through the front side of the cylinder head 23. This opening lies in a plane S3, as seen in FIG. 2, and is closed by a cover plate 78 that is affixed to the cylinder head 23 in a suitable manner.

A second intermediate or cam driving shaft 79 is journaled in the front side of the cylinder head member 23 in an appropriate manner. This cam driving or second intermediate shaft is formed with a sprocket 81 that is engaged with and driven by the chain 75.

An idler sprocket 82 is mounted in the cylinder block and drives a shaft 83 for a manner to be described, in addition to maintaining tensioning on the chain 75. The timing chain 75 is also provided with an adjustable tensioner 84, which is accessible at the front of the cylinder block for adjusting the tension on the chain 75 in a well-known manner.

The second intermediate or cam driving shaft 79 carries a sprocket 85 at the flywheel end of the engine and which extends in a portion of the cylinder head member 23 that extends axially beyond the end of the cylinder block member 22. This sprocket drives a second chain 86, which is trained around sprockets 87 and 88 that are affixed to the corresponding ends of the intake and exhaust camshafts 46 and 65, respectively, so as to drive them.

The transmission ratio provided by the sprockets driving the first chain 75 and the second chain 86 are such that the camshafts 46 and 54 are driven at one-half crankshaft speed. This reduction in speed can be obtained in a single pass in one of the transmissions or in increments with both transmissions. By using a two-step reduction, it is possible to maintain smaller pulleys or sprockets 87 and 88 at the cylinder end of the engine, and make the engine assembly more compact.

Figure 7:
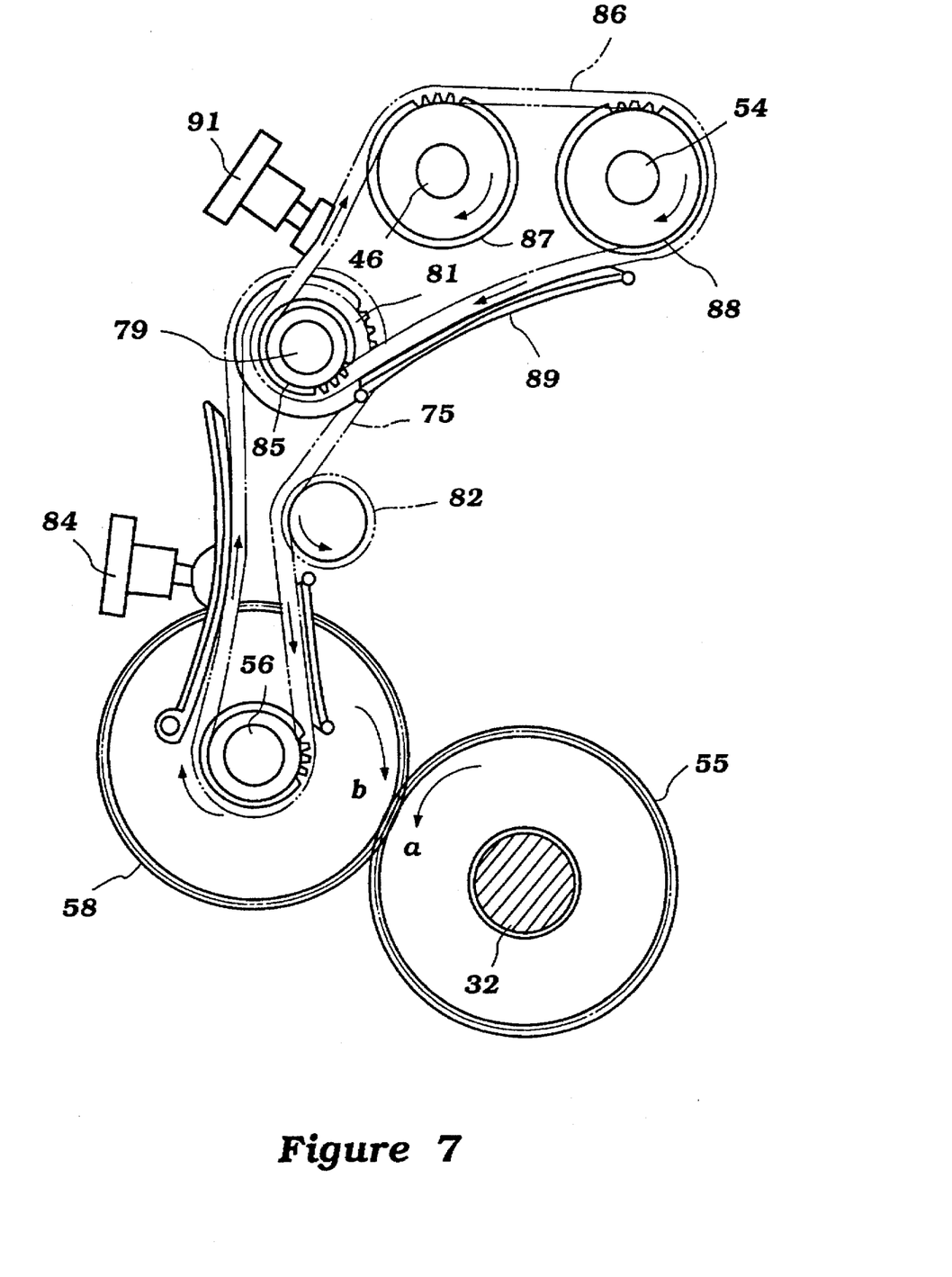
FIG. 7 is a front elevational view showing the camshaft drive.
Figure 8:
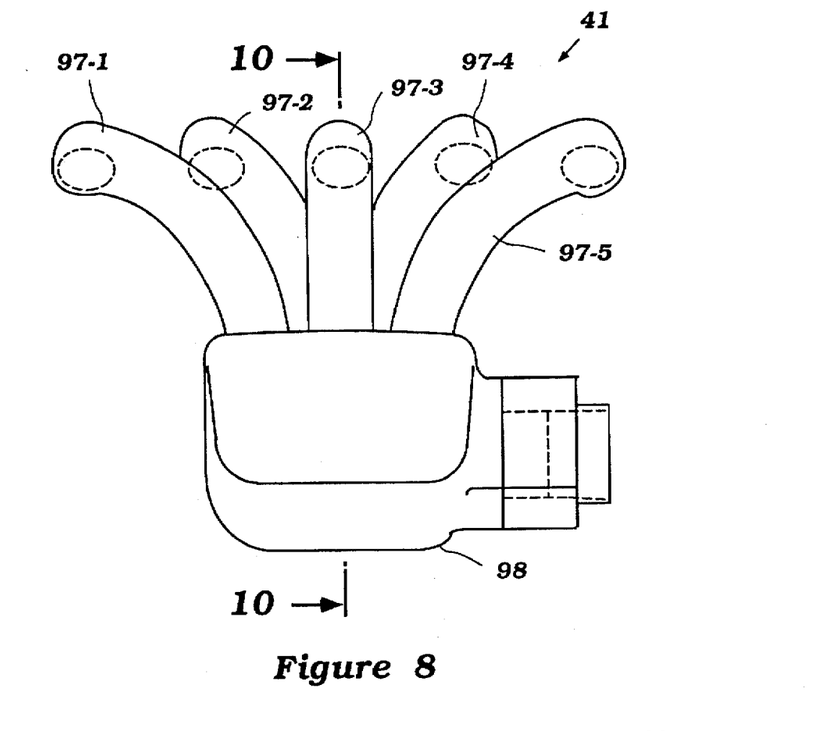
FIG. 8 is a side elevational view of the intake manifold.

As best seen in FIG. 7, a guide arrangement indicated by the reference numeral 89 is positioned in engagement with the return flight of the chain 86 between the exhaust camshaft sprocket 88 and the camshaft driving sprocket 85. In addition, an adjustable tensioner 91 is provided on the driving flight side of the chain 86 between the sprocket 85 and the intake camshaft drive sprocket 87. This tensioner 95 is readily accessible at the upper forward portion of the engine.

The sprocket 87 may be coupled to the intake camshaft 46 by a variable valve timing mechanism (VVT), indicated by the reference numeral 92. A similar arrangement (not shown) may also be provided between the exhaust camshaft drive sprocket 88 and the exhaust camshaft 54.

A number of engine auxiliaries and drive components may be driven from the various shafts as thus far described. These include, among other things, a water pump 92 that is driven by the idler sprocket 82 of the first timing chain 75. Also, an accessory such as an air conditioning compressor 93 is driven off of the front of the intermediate shaft 56. A pulley 94 may be affixed to the exposed rear end of the shaft and drive other accessories as will be noted later. Since this pulley 94 is spaced inwardly from the torsional damper 35, the overall length of the engine can be kept quite small.

A starter motor 95 is mounted on the lower side of the crankcase member 24 and cooperates with a starter gear 96 on the flywheel 36 for electric starting of the engine 21.

The intake manifold assembly 41 will now be described by primary reference to FIGS. 1, 2, and 8–11. The intake manifold 41 is configured so as to provide equal and desired length runners to the individual cylinder head intake passages 39, a relatively large surge tank, and also permit unencumbered access to the timing drive, and specifically the chains 75 and 86.

Figure 9:
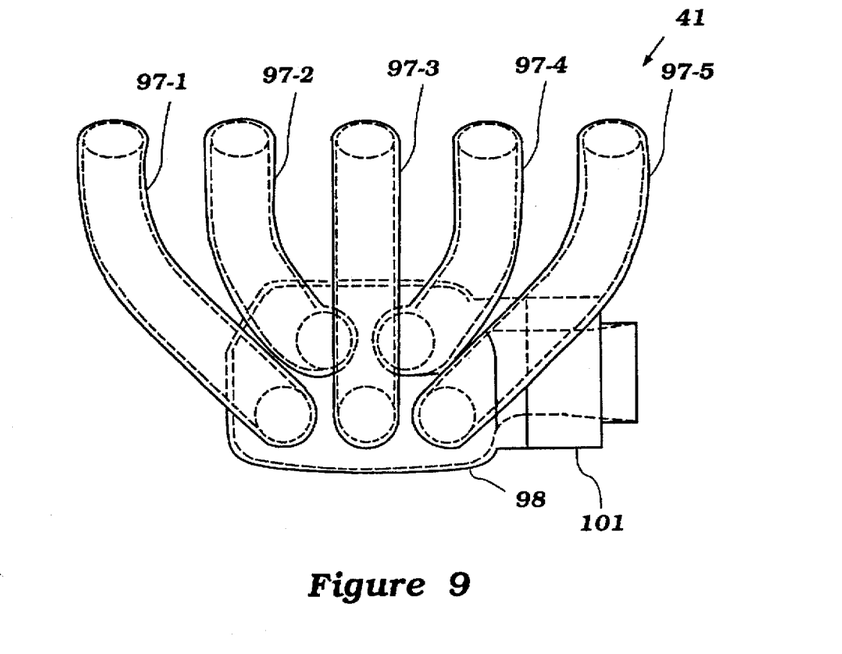
FIG. 9 is a top plan view of the intake manifold.
Figure 10:
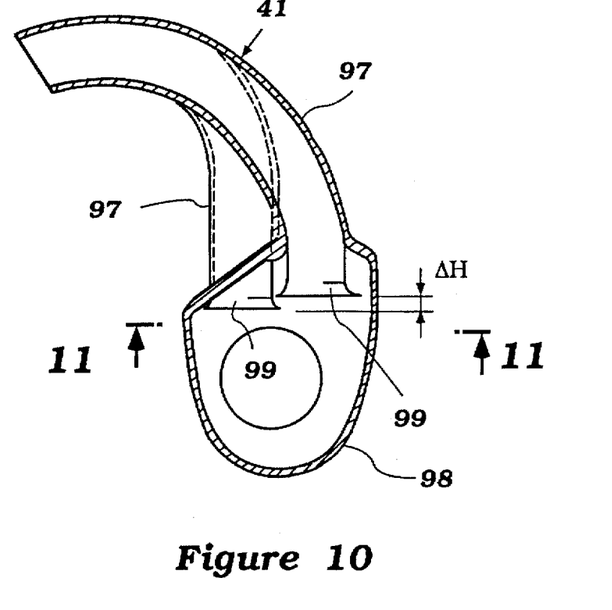
FIG. 10 is a cross-sectional view of the intake manifold taken along the line 10—10 of FIG. 8.
Figure 11:
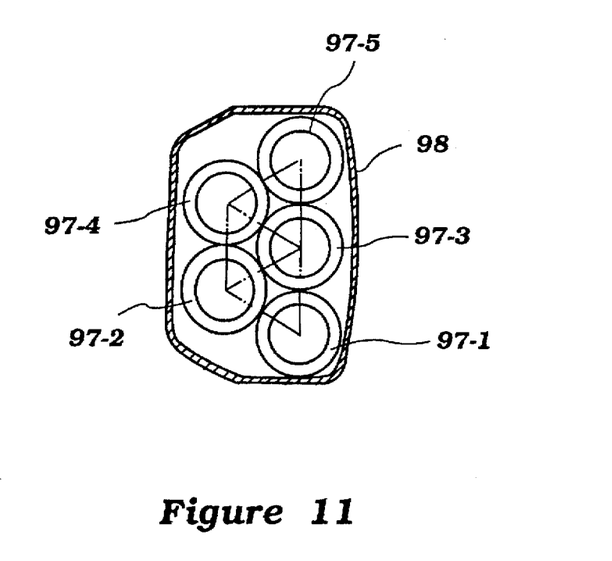
FIG. 11 is a cross-sectional view of the intake manifold taken along the line 11—11 of FIG. 10.

The intake manifold 41 includes a plurality of manifold runners 97-1 through 97-5, each associated with a respective one of the cylinder bores 25 numbered in accordance with the aforenoted numbering pattern. It will be seen that the runners 97 extend generally upwardly then transversely forwardly, and then curve downwardly so as to enter a plenum chamber or surge tank 98 that is disposed at the forward side of the engine and substantially rearwardly of the opening portion 62 through which the timing chain 75 may be accessed. These runners have different angles of curvature and also enter the plenum chamber 98 in a staggered relationship, as best seen in FIGS. 9 and 11. This staggering is done so as to maintain a compact configuration for the plenum chamber 98 and equal length for each of the runners 97. In order to maintain this equal length, each runner has an extending portion 99 that enters into the plenum chamber 98, and which have different lengths Δh into the plenum chamber so as to further maintain the desired equal length. By virtue of this arrangement, it can be ensured that the cylinders of the engine are all served uniformly.

A throttle body 101 is mounted to an atmospheric air inlet opening of the plenum chamber or surge tank 98 for controlling the air flow thereto. Air is delivered to the throttle body 101 by a remotely positioned silencer and flexible conduit.

A supporting bracket or mounting boss 102 (FIG. 2) assists in the support of the induction system, and particularly the plenum chamber 98.

Referring also to FIG. 2, this indicates the drive for certain other engine accessories in addition to those aforenoted. These include a belt 103 that is driven by the aforenoted intermediate shaft pulley 94. The belt 103 drives, among other things, an alternator 104 and an air conditioning compressor 105. An idler pulley 106 and tensioner pulley 107 are provided for controlling the path and tension of the belt 103.

Finally, an oil pump 108 is mounted in the crankcase member 24 and has an oil pick 109 for picking up oil and delivering it to the engine lubricating system. The oil pump 108 is driven by any suitable arrangement off of the intermediate shaft 56 or the crankshaft 32.

Thus, it should be readily apparent from the foregoing description that the described arrangement provides a very compact engine that has twin overhead camshafts that are driven from a point between the ends of the engine and which is nevertheless easily accessible for servicing. Of course, the foregoing description is that of a preferred embodiment of the invention, and various changes and modifications may be made without departing from the spirit and scope of the invention, as defined by the appended claims.

What is claimed is:

1. An engine comprised of a main body assembly comprised of a cylinder head member, a cylinder block member and a crankcase member affixed together, said cylinder block member forming a plurality of cylinder bores containing pistons reciprocating therein, said cylinder block member and said crankcase member defining a crankcase chamber in which a crankshaft is rotatably journaled, means for driving said crankshaft from said pistons, said cylinder head member, said cylinder block member and said pistons forming combustion chambers, a plurality of flow passages formed in said cylinder head member and serving said combustion chambers, valves supported in said cylinder head member for controlling the flow through said flow passages, at least one camshaft journaled for rotation in a cam chamber formed in said cylinder head member for actuating at least some of said valves, said cam chamber being surrounded by a planar surface of said cylinder head member closed by a cam cover, an intermediate shaft journaled for rotation in a cavity formed in one of said engine body members at one side thereof that extends in a plane that is disposed at an angle to said planar surface and which intersects the plane defined by said planar surface in a longitudinally extending line which is parallel to a rotational axis of said intermediate shaft, a first drive for driving said intermediate shaft from said crankshaft a second drive for driving said camshaft from said intermediate shaft, an opening formed in said one side of said one body member into said cavity, and a removable cover closing said opening, said opening being in overlying relationship to at least one of said drives and said intermediate shaft and extending longitudinally in the direction of said intermediate shaft rotational axis.

2. An engine as defined in claim 1, wherein the opening extends along a substantial portion of the length of the one body member.

3. An engine as defined in claim 2, wherein the opening is formed in the cylinder block member.

4. An engine as defined in claim 3, wherein the cylinder block member is formed with at least three cylinder bores and the intermediate shaft is driven by the first drive directly from the crankshaft between two of said cylinder bores.

5. An engine as defined in claim 4, wherein second drive comprises a second intermediate shaft driven directly from the first mentioned intermediate shaft and driving the cam shaft by a third drive.

6. An engine as defined in claim 5, wherein the second intermediate shaft is journalled in the cylinder head member.

7. An engine as defined in claim 6, wherein the drive for the second intermediate shaft and the third drives comprise chain drives.

8. An engine as defined in claim 7, further including a second opening formed in the cylinder head member through which at least a portion of one of the second drive is accessible.

9. An engine as defined in claim 8, wherein there is provided a separate cover for each of the body openings.

10. An engine as defined in claim 2, further including an accessory driven off of one end of the intermediate shaft.

11. An engine comprised of a main body assembly comprised of a cylinder head member, a cylinder block member and a crankcase member affixed together, said cylinder block member forming a plurality of cylinder bores containing pistons reciprocating therein, said cylinder block member and said crankcase member defining a crankcase chamber in which a crankshaft is rotatably journaled, means for driving said crankshaft from said pistons, said cylinder head member, said cylinder block member and said pistons forming combustion chambers, a plurality of flow passages formed in said cylinder head member and serving said combustion chambers, valves supported in said cylinder head member for controlling the flow through said flow passages, at least one camshaft journaled for rotation in said cylinder head member for actuating at least some of said valves, an intermediate shaft journaled for rotation in a cavity formed one of said engine body members at one side thereof, a first drive for driving said intermediate shaft from said crankshaft a second drive for driving said camshaft from said intermediate shaft, an opening formed in said one side of said one body member into said cavity, and a removable cover closing said opening, said opening being in overlying relationship to at least one of said drives and said intermediate shaft, said intermediate shaft being journaled by bearing surfaces formed directly in said one body member and said removable cover.

12. An engine as defined in claim 1, wherein the opening has a generally L shape.

13. An engine as defined in claim 12, wherein at least a portion of one of the drives is accessible through the opening.

14. An engine as defined in claim 13, wherein at least a portion of both of the drives are accessible through the opening.

15. An engine as defined in claim 14, wherein the intermediate shaft is accessible through a substantial portion of its length through the long leg of the opening, and at least one of the first and second drives are at least partially accessible through the short leg of the opening and wherein the long leg of the opening extends along the length of the engine and the short leg extends along the height of the engine.

16. An engine as defined in claim 1, further including a second opening in another of the engine body members through which at least a portion of one of the drives is accessible.

17. An engine as defined in claim 16, wherein the first drive is accessible at least in part through the first opening and the second drive is accessible at least in part through the second opening.

18. An engine as defined in claim 17, wherein there is provided a separate cover for each of the body openings.

19. An engine as defined in claim 18, wherein the first opening is formed in the cylinder block member.

20. An engine as defined in claim 19, wherein the cylinder block member is formed with at least three cylinder bores and the intermediate shaft is driven by the first drive directly from the crankshaft between two of said cylinder bores.

21. An engine as defined in claim 20, wherein second drive comprises a second intermediate shaft driven directly from the first mentioned intermediate shaft and driving the cam shaft by a third drive.

22. An engine as defined in claim 21, wherein the second intermediate shaft is journalled in the cylinder head member.

23. An engine as defined in claim 22, wherein the drive for the second intermediate shaft and the third drives comprise chain drives.

24. An engine as defined in claim 23, further including a second opening formed in the cylinder head member through which at least a portion of one of the second drive is accessible.

25. An engine as defined in claim 24, wherein there is provided a separate cover for each of the body openings.

26. An engine as defined in claim 1, further including a manifold system for cooperation with the flow passages disposed on the one side of the engine.

27. An engine as defined in claim 26, wherein the manifold is disposed so that it does not substantially overlie the opening.

28. An engine as defined in claim 1, wherein the crankshaft is journalled at least in part by webs formed by the cylinder block member.

29. An engine as defined in claim 28, wherein the chamber containing the intermediate shaft is formed by a wall adjacent the crankcase chamber, said wall being formed with at least one opening for reducing pumping losses in the crankcase chamber.

* * * * *